(12) United States Patent
Ibata et al.

(10) Patent No.: US 6,628,025 B2
(45) Date of Patent: Sep. 30, 2003

(54) MICRO-MOTOR AND APPARATUS USING THE SAME MOTOR

(75) Inventors: Eiichi Ibata, Tottori (JP); Toshiaki Tsuzaki, Tottori (JP); Hideo Kobayashi, Tottori (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/017,446

(22) Filed: Dec. 14, 2001

(65) Prior Publication Data

US 2002/0089247 A1 Jul. 11, 2002

(30) Foreign Application Priority Data

Dec. 15, 2000 (JP) .......................................... 2000-381882

(51) Int. Cl.[7] ................................................ H02K 7/65
(52) U.S. Cl. ........................ 310/81; 310/90; 310/90.5; 310/263; 310/75 D; 310/36
(58) Field of Search ........................... 310/81, 90, 90.5, 310/36, 75 D, 263

(56) References Cited

U.S. PATENT DOCUMENTS

| | | | |
|---|---|---|---|
| 5,107,155 A | * 4/1992 | Yamaguchi | ................... 310/81 |
| 5,373,207 A | * 12/1994 | Yamaguchi et al. | ........... 310/81 |
| 5,780,947 A | 7/1998 | Fukuoka et al. | |
| 5,798,588 A | * 8/1998 | Okuyama et al. | .............. 310/81 |
| 6,140,721 A | 10/2000 | Ibata et al. | |
| 6,420,809 B1 | * 7/2002 | Obara | ........................... 310/90 |
| 6,495,939 B1 | * 12/2002 | Yamaguchi et al. | ........... 310/81 |
| 6,563,242 B2 | * 5/2003 | Ibata et al. | .................... 310/90 |
| 2002/0089247 A1 | * 7/2002 | Ibata et al. | .................... 310/81 |

FOREIGN PATENT DOCUMENTS

| | | | |
|---|---|---|---|
| GB | 2 278 737 | 12/1994 | |
| JP | 55-010858 | 1/1980 | |
| JP | 56-012850 | 2/1981 | |
| JP | 08-067449 | * 2/1996 | .......... H02K/7/065 |
| JP | 08-298746 | 11/1996 | |
| JP | 10-217272 | * 7/1998 | .......... H02K/23/58 |
| JP | 2000-50597 | 2/2000 | |
| JP | 2002177884 | * 6/2002 | .......... H02K/7/065 |
| JP | 2002330567 | * 11/2002 | .......... H02K/7/065 |
| JP | 2003032973 | * 1/2003 | .......... H02K/7/065 |

OTHER PUBLICATIONS

International Search Report dated Jul. 3, 2002.

* cited by examiner

*Primary Examiner*—Nestor Ramirez
*Assistant Examiner*—Heba Y. Elkassabgi
(74) *Attorney, Agent, or Firm*—RatnerPrestia

(57) ABSTRACT

A motor includes (a) a cylindrical frame made of ferromagnetic material, (b) a pipe fitted in and disposed within the frame concentrically, (c) a sintered bearing press-fitted into the pipe, (d) a cylindrical magnet fixed on an outer wall of the pipe at an inner wall of the magnet, and (e) a cylindrical coil facing the magnet via an annular space, where the frame and the pipe are welded at a fitted section therebetween. This structure allows the motor to withstand a strong enough shock. An apparatus requiring a vibration motor can employ this motor having a large vibrator, so that great vibrations are available for the apparatus. As a result, the apparatus—utilizing the great vibrations as various functions—is obtainable.

12 Claims, 6 Drawing Sheets

MICRO-MOTOR AND APPARATUS USING THE SAME MOTOR

TECHNICAL FIELD

The present invention relates to a micro-motor employed in portable electronic apparatuses or home-use electronic apparatuses such as game machines.

BACKGROUND ART

Some of portable electronic apparatuses use a motor. Manufacturers in this trade are fiercely competing with each other in downsizing and reducing weight of their products. Particularly in the market of portable-information apparatuses including cellular phones, the manufacturers have been competing for weight reduction by 0.1 g. On the other hand, a motor to be mounted to a portable apparatus is expected to withstand a strong enough shock produced when the apparatus is dropped. The motor thus must accommodate two contradictory subjects, i.e., downsizing and strengthening.

One of the conventional motors discussed above is disclosed in the Japanese Patent Application Non-Examined Publication No. 2000-50597. FIG. 6 shows this motor. Rotation of the motor, i.e., the rotation of shaft 358, entails vibrator 356 mounted to shaft 358 to spin. Because vibrator 356 shapes in an unbalanced form, the spin produces vibrations. If a cellular phone employs this motor, the vibrations can notify the phone-user of a message arrival.

In FIG. 6, pipe 352—fixing magnet 354—is disposed within socket frame 351. In this structure, when a shock is applied to the motor due to dropping the phone, the loads of vibrator 356, coil 355, magnet 354 and others are applied to pipe 352. Enough strength is thus needed for holding frame 351 and pipe 352 together.

Greater load is applied at a shock when larger vibrator 356 is used for obtaining greater vibrations, and the load exceeds the strength holding frame 351 and pipe 352 together. Then pipe 352 slides off frame 351, and coil 355 touches frame 351, so that the motor fails to spin. As a result, a vibrator size is restricted and the motor should be mounted to an apparatus at a place free from a great shock.

Fit-in margin raging from 20 $\mu$m to 30 $\mu$m between socket frame 351 and plug pipe 352 is needed in order to maintain sufficient holding-strength therebetween when they are press-fitted. Thus sintered bearing 357, which is press-fitted into pipe 352, receives pressure from the outside, and the inner diameter of bearing 357 is contracted, which produces irregular inner diameters. As a result, bearing 357 fails to keep shaft 358 stably, and unstable r.p.m. of the motor is expected.

DISCLOSURE OF THE INVENTION

The present invention addresses the problems discussed above, and aims to provide a motor, which can withstand a strong enough shock due to a drop and avoid any changes in both characteristics and functions. The present invention also aims to provide an apparatus employing the same motor. Further, when the motor of the present invention is going to employ a vibrator, it can employ a larger vibrator than a conventional one because the motor is equipped with strong enough shock-proof strength. Greater vibrations can be thus obtained, and a vibration micro-motor with a stable r.p.m. and excellent characteristics can be realized. An apparatus employing the same motor can be also provided.

The motor of the present invention comprises the following elements:

(a) a cylindrical frame made of ferromagnetic material;
(b) a pipe fitted-in and disposed within the frame concentrically, where the fitted section between the pipe and the frame is welded;
(c) a sintered bearing press-fitted inside the pipe;
(d) a cylindrical magnet fixed on an outer wall of the pipe at its inner wall; and
(e) a cylindrical coil facing the magnet via an annular space.

An apparatus of the present invention comprises the following elements:

(a) a housing;
(b) a motor disposed in the housing, where the motor has the structure discussed above; and
(c) a power supply mechanism for powering the motor.

This structure allows the holding strength between the frame and the pipe to be greater than the conventional one, which has been produced by press-fit of both the elements. Thus the pipe is prevented from being slid off the frame due to the shock produced by dropping the apparatus, and the problem of changes in the characteristics as well as in the functions can be solved. The apparatus employing this motor can withstand a strong shock corresponding to the improved shock-proof capability of the motor.

Since the fitted section between the frame and the pipe is welded, the pipe can be lightly press-fitted into the frame as a pre-treatment. Therefore, the sintered bearing disposed inside the pipe receives less pressure from the outside, and the bearing is free from variations in its inner diameter, so that the motor can produce a stable r.p.m. with excellent characteristics.

In an apparatus which is going to employ a vibration motor having a vibrator, a vibrator larger than a conventional one—corresponding to the improved shock-proof strength of the motor—can be used, so that the apparatus can obtain greater vibrations. The apparatus thus becomes ideal for notifying an apparatus-user of a message arrival with vibrations.

EXEMPLARY EMBODIMENTS OF THE INVENTION

Exemplary embodiments of the present invention are demonstrated hereinafter with reference to the accompanying drawings.

First Exemplary Embodiment

Figure 1:
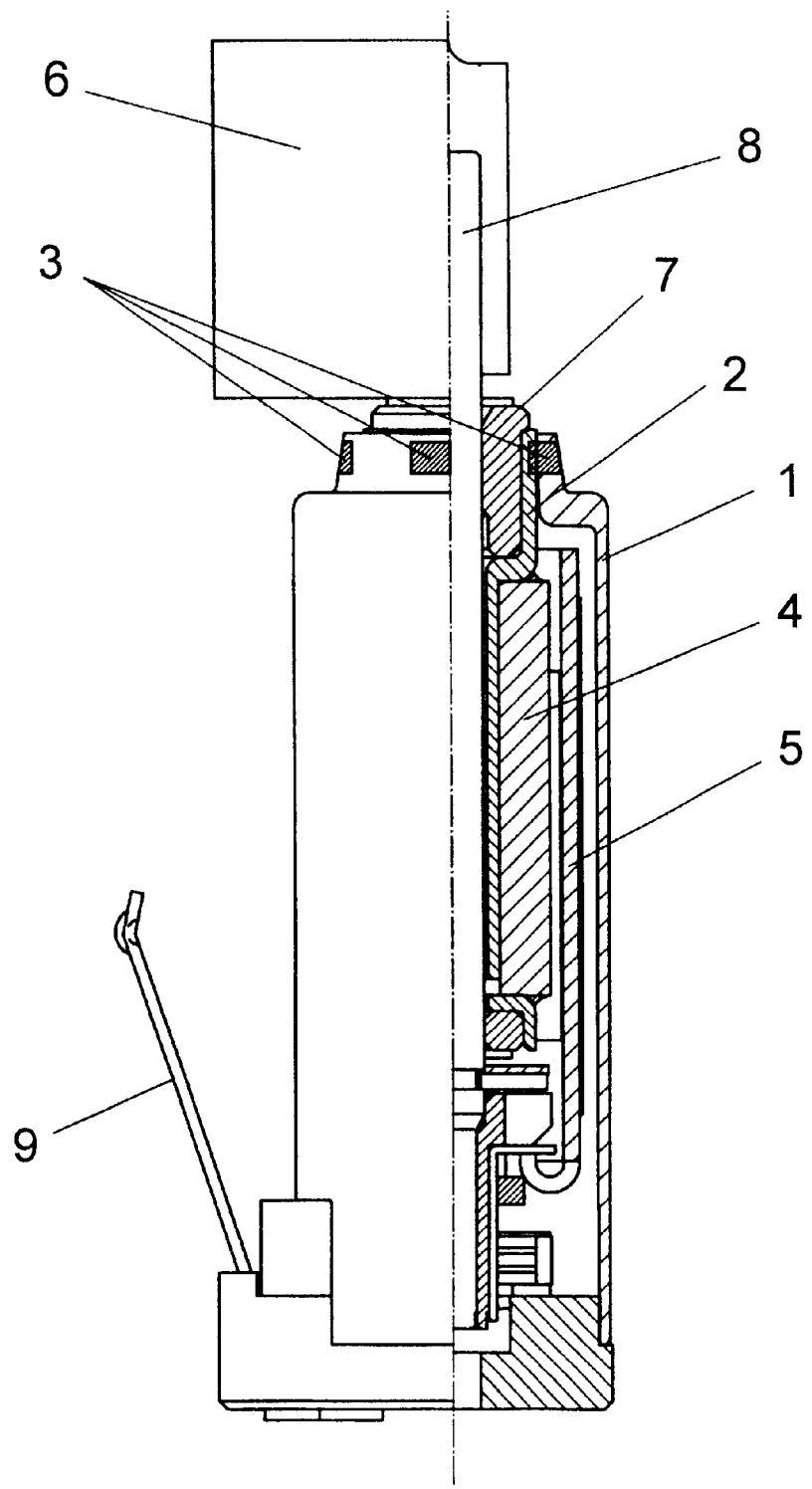
FIG. 1 shows a structure of a motor in accordance with a first exemplary embodiment of the present invention.

FIG. 1 shows a structure of a motor in accordance with the first exemplary embodiment of the present invention.

The motor in accordance with the first embodiment includes slim and cylindrical frame 1 made of ferromagnetic material. Within socket frame 1, plug pipe 2 is fixed concentrically with frame 1. On the inner wall of a first side of pipe 2, sintered bearing 7 is press-fitted. On the outer wall of a second side of pipe 2, an inner wall of cylindrical magnet 4 is fixed. Further, cylindrical coil 5 surrounds magnet 4, in other words, coil 5 faces the outer wall of magnet 4 via an annular space.

Coil 5 is connected to a commutator, and motor terminal 9 is connected to a brush. An outer power source (not shown) applies a voltage across terminal 9, thereby powering coil 5 via the sliding contact between the brush and the commutator. Magnet 4 functions as a stator that forms magnetic field, and coil 5 functions as a rotor that spins outside magnet 4. Rotor coil 5 is connected to shaft 8, and one end of shaft 8 is connected to vibrator 6, which is made of metal having a heavy specific gravity such as tungsten and shapes in an unbalanced form as shown in FIG. 1. Shaft 8 is journaled by bearing 7. When the rotor spins, vibrator 6 rotates, which produces vibrations. For instance, when the motor is mounted in a cellular phone, the vibrations can notify a phone-user of a message arrival.

In the motor in accordance with this first embodiment, the fitted section between frame 1 and pipe 2 is welded with resistance welding 3. This welding improves the holding strength between frame 1 and pipe 2, so that strong shockproof is obtainable. Therefore, if large vibrator 6 is attached to shaft 8, no problem occurs at a drop shock, and this structure allows the motor to produce great vibrations.

The fit-in margin (the difference between the inner diameter of socket frame 1 and the outer diameter of plug pipe 2, where the inner diameter is equal to or less than the outer diameter) is specified ranging from 0 $\mu$m (included) to 20 $\mu$m (not included), and pipe 2 is lightly press-fitted into frame 1. In addition to this press-fit, resistance welding 3 is provided to the fitted section between frame 1 and pipe 2. This structure allows the motor to withstand a strong enough shock. It also produces another advantage, i.e., less variations can be expected in the inner diameters of sintered bearing 7, so that the r.p.m. of the motor becomes stable.

Second Exemplary Embodiment

Figure 2:
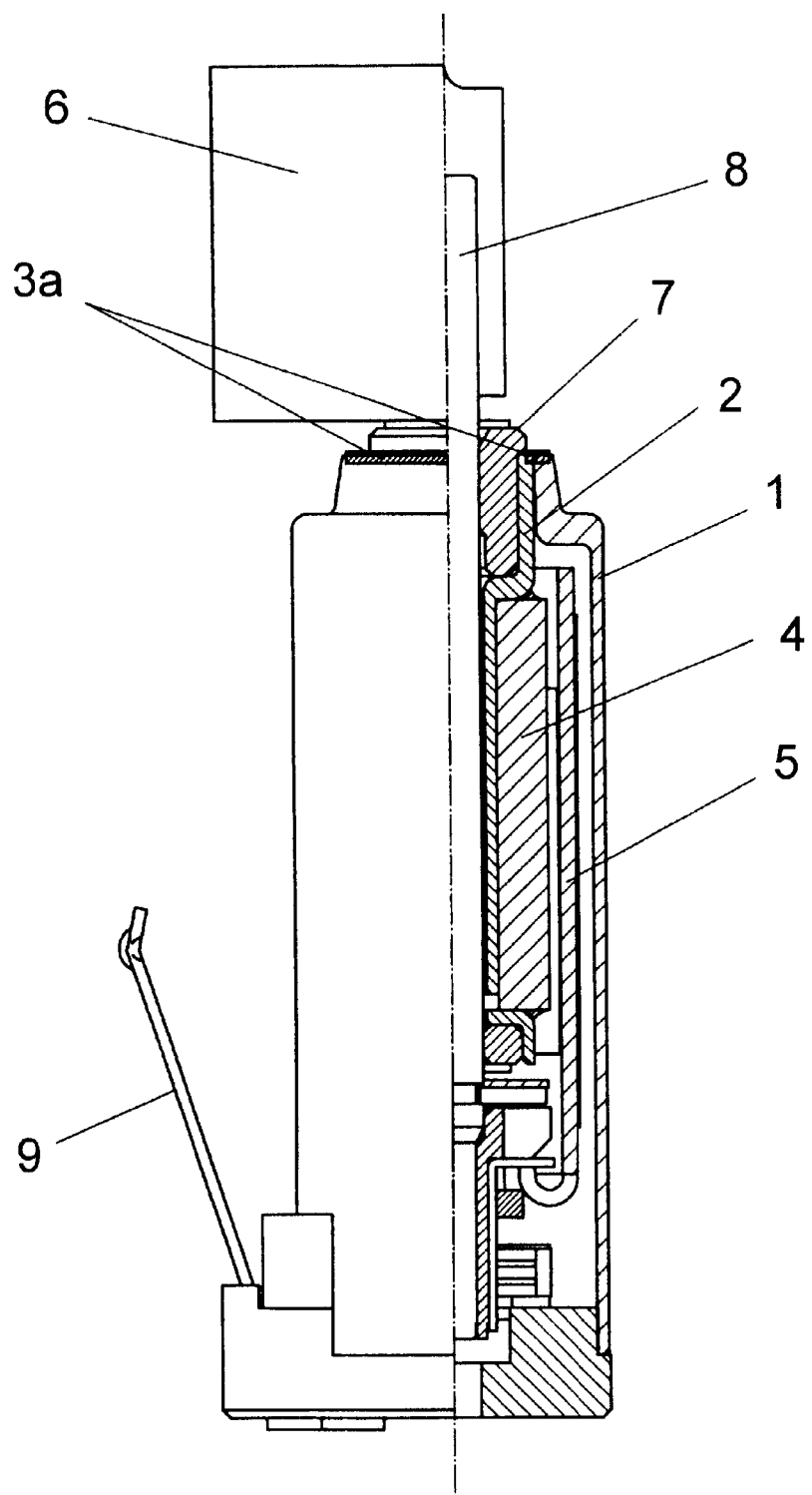
FIG. 2 shows a structure of a motor in accordance with a second exemplary embodiment of the present invention.

FIG. 2 shows a structure of a motor in accordance with the second exemplary embodiment of the present invention. The motor in accordance with the second embodiment differs from the motor of the first embodiment in a method of welding at the fitted section between frame 1 and pipe 2. In other words, laser welding 3a is provided to the fitted section between frame 1 and pipe 2 in this second embodiment, and otherwise the structure in accordance with the second embodiment remains the same as that of the first one. In the second embodiment, if large vibrator 6 is attached to shaft 8, no problem occurs at a drop shock, and the motor thus can produce great vibrations as same as the first embodiment.

The fit-in margin (the difference between the inner diameter of socket frame 1 and the outer diameter of plug pipe 2, where the inner diameter is equal to or less than the outer diameter) is specified ranging from 0 $\mu$m (included) to 20 $\mu$m (not included), and pipe 2 is lightly press-fitted into frame 1. In addition to this press-fit, laser welding 3a is provided to the fitted section between frame 1 and pipe 2. This structure allows the motor to withstand a strong enough shock. It also produces another advantage, i.e., less variations can be expected in the inner diameters of sintered bearing 7, so that the r.p.m. of the motor becomes stable.

Third Exemplary Embodiment

Figure 3:
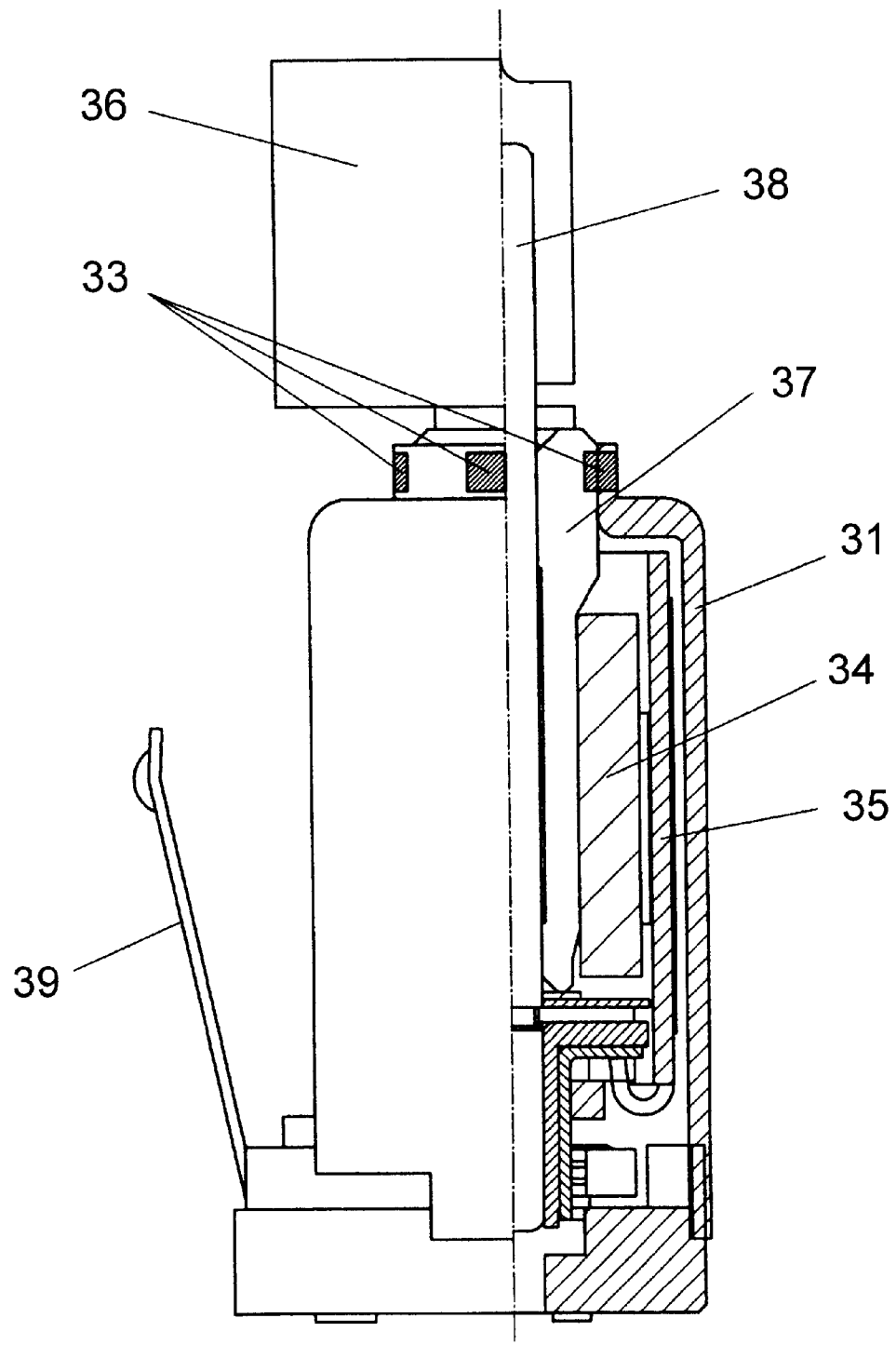
FIG. 3 shows a structure of a motor in accordance with a third exemplary embodiment of the present invention.

FIG. 3 shows a structure of a motor in accordance with the third exemplary embodiment of the present invention. The motor in accordance with the third embodiment includes slim and cylindrical frame 31 made of ferromagnetic material. Within frame 31, sintered bearing 37 is concentrically fixed to frame 31. On the outer wall of bearing 37, the inner wall of cylindrical magnet 34 is fixed. Further, cylindrical coil 35 surrounds magnet 34, in other words, coil 35 faces the outer wall of magnet 34 via an annular space.

Coil 35 is connected to a commutator, and motor terminal 39 is connected to a brush. An outer power source (not shown) applies a voltage across terminal 39, thereby powering coil 35 via the sliding contact between the brush and the commutator. Magnet 34 functions as a stator that forms magnetic field, and coil 35 functions as a rotor that spins outside magnet 34. Rotor coil 35 is coupled to shaft 38, and one end of shaft 38 is coupled to vibrator 36, which is made of metal having a heavy specific gravity such as tungsten and shapes in an unbalanced form as shown in FIG. 3. Shaft 38 is journaled by bearing 37. When the rotor spins, vibrator 36 rotates, which produces vibrations. For instance, when the motor is mounted in a cellular phone, the vibrations can notify a phone-user of a message arrival.

In the motor in accordance with this third embodiment, the fitted section between frame 31 and bearing 37 is welded with resistance welding 33. This welding improves the holding strength between frame 31 and bearing 37, so that strong shockproof is obtainable. Therefore, if large vibrator 36 is attached to shaft 38, no problem occurs at a drop shock, and this structure allows the motor to produce great vibrations. The vibration motor for producing great vibrations is thus obtainable.

The fit-in margin (the difference between the inner diameter of frame 31 and the outer diameter of bearing 37, where the inner diameter is equal to or less than the outer diameter) is specified ranging from 0 $\mu$m (included) to 20 $\mu$m (not included), and bearing 37 is lightly press-fitted into frame 31. In addition to this press-fit, resistance welding 33 is provided to the fitted section between frame 31 and bearing 37. This structure allows the motor to withstand a strong enough shock. It also produces another advantage, i.e., less variations can be expected in the inner diameters of sintered bearing 37, so that the r.p.m. of the motor becomes stable.

Fourth Exemplary Embodiment

Figure 4:
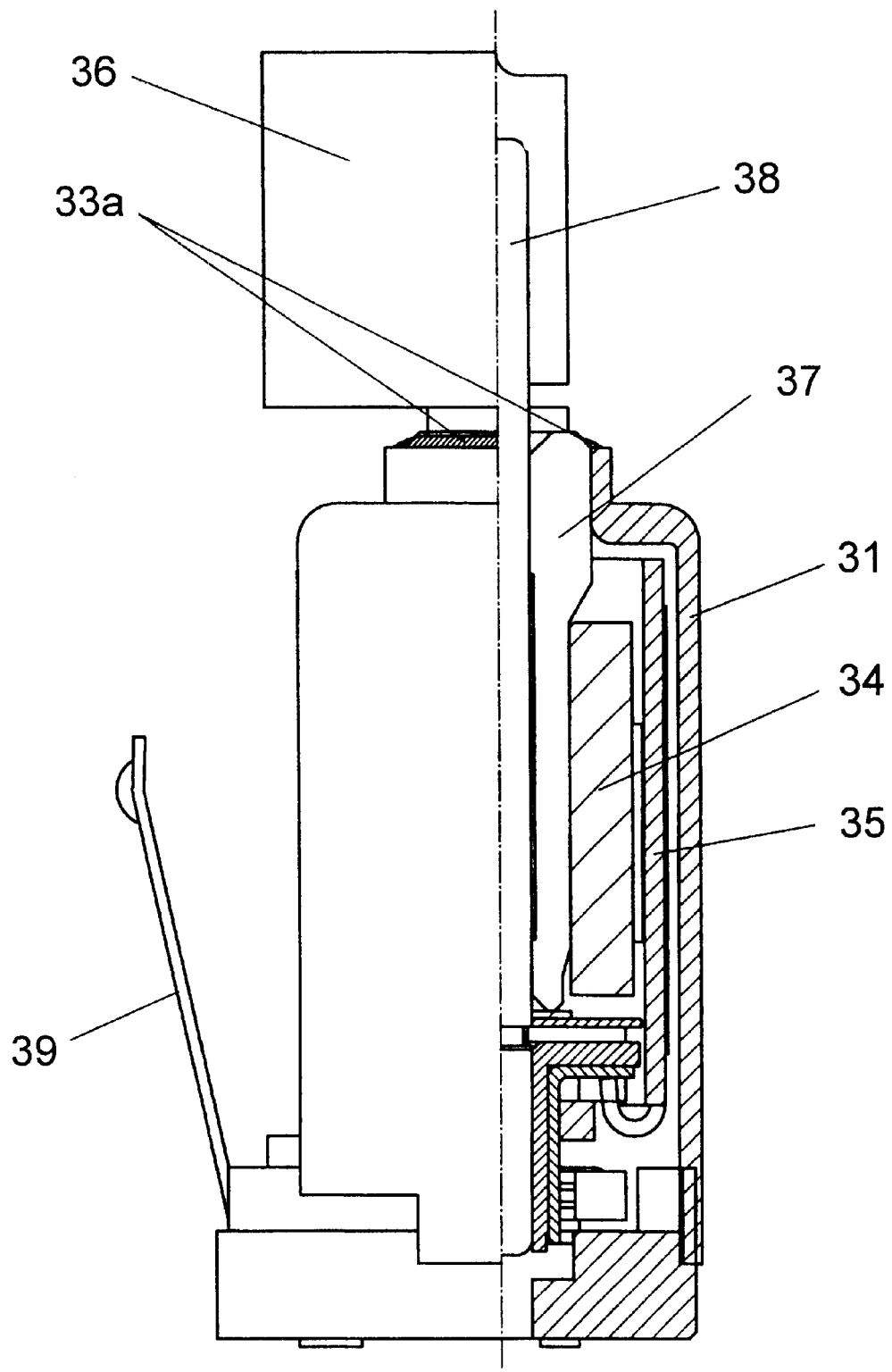
FIG. 4 shows a structure of a motor in accordance with a fourth exemplary embodiment of the present invention.

FIG. 4 shows a structure of a motor in accordance with the fourth exemplary embodiment of the present invention.

The motor in accordance with the fourth embodiment differs from the motor of the third embodiment in a method of welding at the fitted section between frame 31 and sintered bearing 37. In other words, laser welding 33a is provided to the fitted section between frame 31 and bearing 37 in this fourth embodiment, and otherwise the structure in accordance with the fourth embodiment remains the same as that of the third one. In the fourth embodiment, if large vibrator 36 is attached to shaft 38 as same as the third embodiment, no problem occurs at a drop shock, and the motor thus can produce great vibrations. The vibration motor for producing great vibrations is thus obtainable.

The fit-in margin (the difference between the inner diameter of frame 31 and the outer diameter of bearing 37, where the inner diameter is equal to or less than the outer diameter) is specified ranging from 0 $\mu$m (included) to 20 $\mu$m (not included), and bearing 37 is lightly press-fitted into frame 31. In addition to this press-fit, laser welding 33a is provided to the fitted section between frame 31 and bearing 37. This structure allows the motor to withstand a strong enough shock. It also produces another advantage, i.e., less variations can be expected in the inner diameters of sintered bearing 37, so that the r.p.m. of the motor becomes stable.

Fifth Exemplary Embodiment

Figure 5:
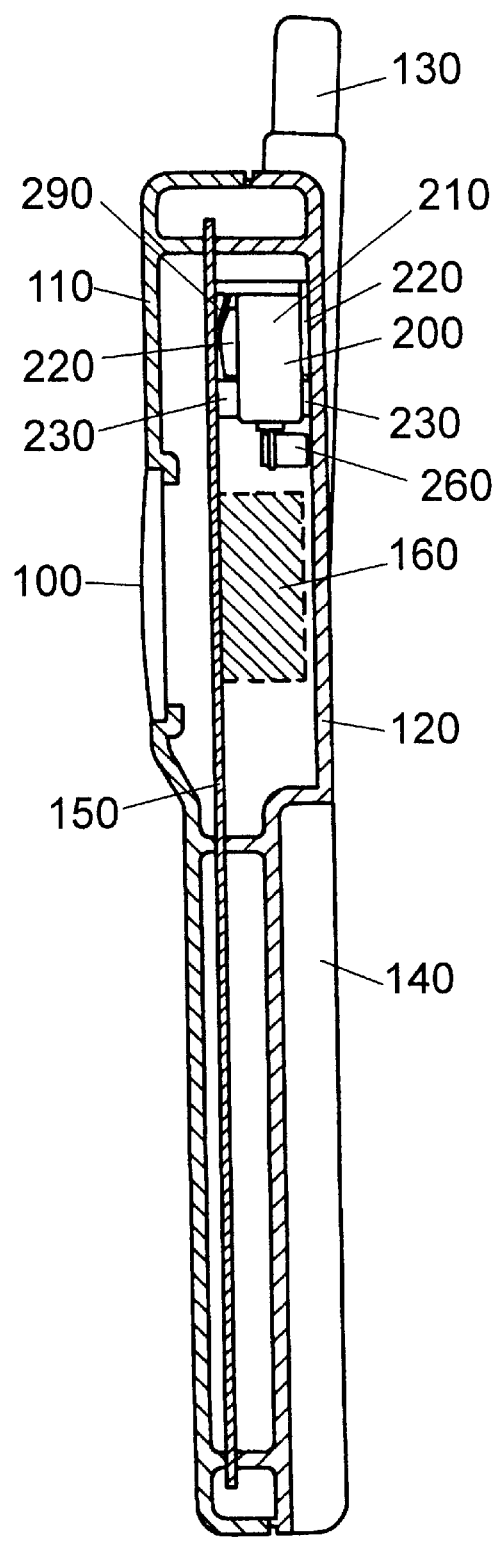
FIG. 5 shows a structure of an apparatus in accordance with a fifth exemplary embodiment of the present invention.
Figure 6:
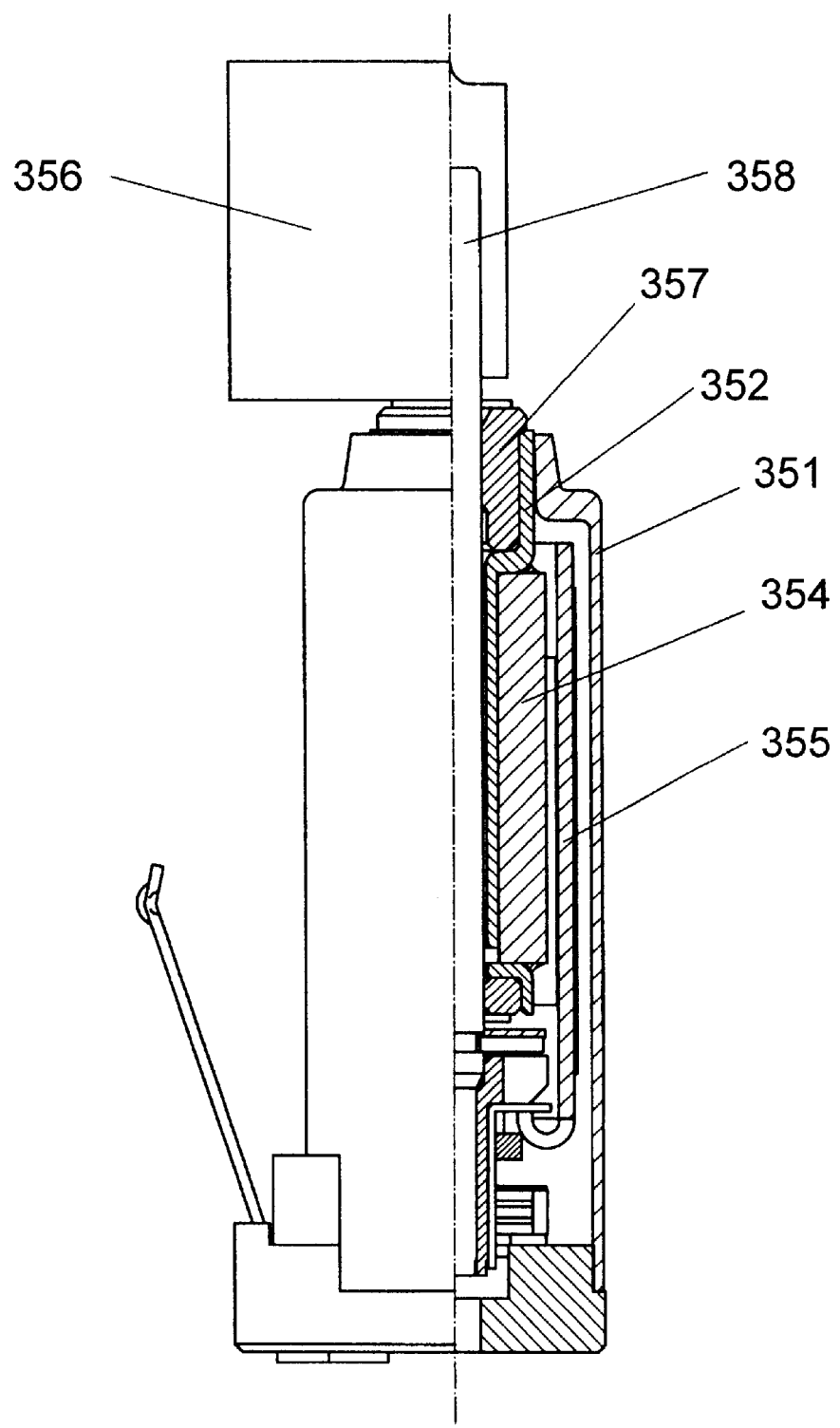
FIG. 6 shows a structure of a conventional motor.

FIG. 5 shows a structure of an apparatus in accordance with the fifth exemplary embodiment of the present invention. To be more specific, FIG. 5 is a lateral sectional view of a cellular phone in which a vibration motor is mounted.

In FIG. 5, an entire housing of cellular phone 100 comprises upper housing 110 and lower housing 120. Antenna 130 and battery 140 are disposed outside the housing. Copper plating and electroless nickel plating are provided inside the housing, thereby shielding the inside. Board 150 is placed inside the housing, and communication module 160—a radio transceiver—is mounted to the board. Module 160 includes a low-noise-amplifier, a detector circuit, a voltage control oscillator (VCO) and the like, and these elements process a high-frequency-small-signal. Vibration motor 200, selectable from any motors in accordance with embodiments 1 through 4, is sandwiched between board 150 and lower housing 120. Cellular phone 100 includes many other components such as a microphone, a receiver, operation keys and a display. They are omitted in the drawings and thus the descriptions thereof are also omitted.

Next, motor 200 and its periphery are demonstrated. Motor 200 includes a shaft to which vibrator 260 is attached. Motor 200, specifically a core-less motor, has dimensions of, e.g., diameter: 4 mm, length: 8 mm, and weight: 0.43 g. An outer shell of motor 200 is formed of cup-shaped frame 210 made of iron system material, and its surface is conductive.

A pair of motor terminals 290—shaping in leaf springs—extend from frame 210 to board 150 such that each terminal 290 makes an arc contact with board 150. Terminals 290 lead to coils inside of the motor, and battery 140 supplies motor-driving-current through terminals 290. The driving current spins the motor, so that vibrator 260 rotates and generates vibrations. The vibrations notify a phone-user of a message arrival.

Frame 210 is wrapped in first elastic member 220 and second elastic member 230, and sandwiched between board 150 and lower housing 120. First elastic member 220 is made of insulating synthetic rubber, and it wraps frame 210, and at the same time, urges motor terminals 290 against feeding terminals (not shown) formed on board 150. In other words, motor terminals 290 and the feeding terminals on the board form a mechanism for powering the motor.

Second elastic member 230 is made of conductive synthetic rubber, and wraps and holds the remaining section of frame 210. At the same time, second elastic member 230 functions as an electric conductor between frame 210 and grounding terminal (not shown) formed on board 150.

The apparatus in accordance with this fifth embodiment includes a motor having a fit-in margin as same as the first and the second embodiments. In other words, the fit-in margin (the difference between the inner diameter of socket frame 210 and the outer diameter of a plug pipe, where the inner diameter is equal to or less than the outer diameter) is specified ranging from 0 μm (included) to 20 μm (not included), and the pipe is lightly press-fitted into the frame. In addition to this press-fit, resistance welding or laser welding is provided to the fitted section between frame 210 and the plug pipe. Therefore, if large vibrator 260 is attached to the shaft, no problem occurs at a drop shock, and great vibrations can be thus obtained. This structure produces another advantage, i.e., less variations can be expected in the inner diameters of a sintered bearing disposed inside the pipe, so that the r.p.m. of the motor becomes stable. The vibration micro-motor equipped with improved shock-proof strength, great vibrations and stable characteristics can be thus realized. In an apparatus employing the same motor, the improved shock-proof strength, great vibrations and stable characteristics similar to those of the motor can be also realized.

The motor employed in the apparatus in accordance with the fifth embodiment can be the motor demonstrated in the third or fourth embodiment. In such a case, the fit-in margin between frame 210 and the sintered bearing is specified ranging from 0 μm (included) to 20 μm (not included), and the sintered bearing is lightly press-fitted into frame 210, as same as both the embodiments. In addition to this press-fit, resistance welding or laser welding is provided to the fitted section between frame 210 and the sintered bearing. Therefore, if large vibrator 260 is attached to the shaft, no problem occurs at a drop shock, and great vibrations can thus obtained. This structure produces another advantage, i.e., less variations can be expected in the inner diameters of the sintered bearing, so that the r.p.m. of the motor becomes stable. The vibration micro-motor equipped with improved shock-proof strength, great vibrations and stable characteristics can be thus realized. In the apparatus employing the same motor, the improved shock-proof strength, great vibrations and stable characteristics similar to those of the motor can be also realized.

The apparatus of the present invention is not limited to the cellular phone discussed above, but is available in other portable electronic apparatuses and home-use electronic apparatuses such as a game machine. The motor of the present invention is employed in the apparatus, so that the apparatus is equipped with improved shock-proof strength and stable characteristics. When this motor is used as a vibration motor in an apparatus, the apparatus can produce great vibrations, which can be utilized for notifying a phone-user of a message arrival, giving a warning to a user of a home-use apparatus, or providing a user of a game machine with virtual feeling. The alarm function using the vibrations can be utilized in various industrial apparatuses.

As discussed above, since a fitted section between a frame and a pipe of a motor, or the fitted section between the frame and a sintered bearing of the motor is welded, the motor can withstand a strong enough shock. Thus an apparatus employing this motor can also withstand the strong shock. When the motor of the present invention is used as a vibration motor, a large vibrator can be attached to a shaft of the motor, so that the motor can produce great vibrations. An apparatus employing this vibration motor can utilize the great vibrations as various tools, and also be equipped with improved shock-proof strength which prevents the apparatus from changes its characteristics and functions even the apparatus is dropped with a great shock. A fit-in margin at the fitted section is specified ranging from 0 μm (included) to 20 μm (not included), so that less variations in the inner diameters of the sintered bearing can be expected. A stable r.p.m. of the motor is thus advantageously obtainable.

What is claimed is:
1. A motor comprising:
 (a) a cylindrical frame made of ferromagnetic material;
 (b) a pipe fitted in and disposed within said frame concentrically at a fitted section of the frame, an outer diameter of the pipe being larger than an inner diameter of the frame at the fitted section, the difference between the inner diameter of the frame at the fitted section and an outer diameter of the pipe being between 0 μm and 20 μm;

(c) a sintered bearing press-fitted into said pipe;

(d) a cylindrical magnet fixed on an outer wall of said pipe at an inner wall of said magnet; and (e) a cylindrical coil facing said magnet via an annular space, wherein said frame and said pipe are welded at the fitted section.

2. The motor of claim 1, wherein the welding is one of resistance welding and laser welding.

3. The motor of claim 1, wherein said motor is a vibration motor.

4. A motor comprising:

(a) a cylindrical frame made of ferromagnetic material;

(b) a sintered bearing fitted in and disposed within said frame concentrically at a fitted section of the frame, an outer diameter of the sintered bearing being larger than an inner diameter of the frame at the fitted section, the difference between the inner diameter of the frame at the fitted section and an outer diameter of the sintered bearing being between 0 $\mu$m and 20 $\mu$m;

(c) a cylindrical magnet fixed on an outer wall of said sintered bearing at an inner wall of said magnet; and (d) a cylindrical coil facing said magnet via an annular space, wherein said frame and said sintered bearing are welded at the fitted section.

5. The motor of claim 4, wherein the welding is one of resistance welding and laser welding.

6. The motor of claim 4, wherein said motor is a vibration motor.

7. An apparatus comprising:

(a) a housing; and (b) a motor disposed in said housing, said motor including:

(b-1) a cylindrical frame made of ferromagnetic material;

(b-2) a pipe fitted in and disposed within said frame concentrically at a fitted section of the frame, an outer diameter of the pipe being larger than an inner diameter of the frame at the fitted section, the difference between the inner diameter of the frame at the fitted section and the outer diameter of the pipe is between 0 $\mu$m and 20 $\mu$m;

(b-3) a sintered bearing press-fitted into said pipe;

(b-4) a cylindrical magnet fixed on an outer wall of said pipe at an inner wall of said magnet; and (b-5) a cylindrical coil facing said magnet via an annular space, wherein said frame and said pipe are welded at the fitted section.

8. The apparatus of claim 7, wherein the welding is one of resistance welding and laser welding.

9. The apparatus of claim 7, wherein said motor is a vibration motor.

10. An apparatus comprising:

(a) a housing;

(b) a motor disposed in said housing, said motor including:

(b-1) a cylindrical frame made of ferromagnetic material;

(b-2) a sintered bearing fitted in and disposed within said frame concentrically at a fitted section of the frame, an outer diameter of the sintered bearing being larger than an inner diameter of the frame at the fitted section, the difference between the inner diameter of the frame at the fitted section and an outer diameter of the sintered bearing being between 0 $\mu$m and 20 $\mu$m;

(b-3) a cylindrical magnet fixed on an outer wall of said sintered bearing at an inner wall of said magnet; and (b-4) a cylindrical coil facing said magnet via an annular space, wherein said frame and said sintered bearing are welded at the fitted section.

11. The apparatus of claim 10, wherein the welding is one of resistance welding and laser welding.

12. The apparatus of claim 10, wherein said motor is a vibration motor.

* * * * *